United States Patent

Suzuki

[11] Patent Number: 5,289,707
[45] Date of Patent: Mar. 1, 1994

[54] STEERING WHEEL LOCK DEVICE

[75] Inventor: Noriyuki Suzuki, Aichi, Japan

[73] Assignee: Kabushiki Kaisha Tokai Rika Denki Seisakusho, Aichi, Japan

[21] Appl. No.: 87,353

[22] Filed: Jul. 8, 1993

Related U.S. Application Data

[63] Continuation of Ser. No. 800,031, Nov. 29, 1991, abandoned.

[30] Foreign Application Priority Data

Nov. 30, 1990 [JP] Japan .................................. 2-129196

[51] Int. Cl.⁵ .............................................. B60R 25/02
[52] U.S. Cl. ........................................ 70/252; 70/186
[58] Field of Search ................... 70/252, 184, 185, 186

[56] References Cited

U.S. PATENT DOCUMENTS

| | | | |
|---|---|---|---|
| 3,828,594 | 8/1974 | Yamamoto | 70/186 |
| 3,959,996 | 6/1976 | Thirion | 70/186 |
| 4,487,042 | 12/1984 | Mochida et al. | 70/186 |
| 4,495,786 | 1/1985 | Masaki et al. | 70/186 |
| 4,516,415 | 5/1985 | Kobayashi et al. | 70/186 |
| 5,036,686 | 8/1991 | Ichinose | 70/252 |
| 5,092,147 | 3/1992 | Mochida et al. | 70/252 |

FOREIGN PATENT DOCUMENTS

| | | |
|---|---|---|
| 63-74359 | 11/1986 | Japan . |
| 63-166641 | 12/1986 | Japan . |
| 1-1192972 | 1/1988 | Japan . |
| 0192971 | 8/1989 | Japan .................................. 70/252 |
| 153108 | 11/1920 | United Kingdom .................. 70/186 |

Primary Examiner—Peter M. Cuomo
Assistant Examiner—Darnell M. Boucher
Attorney, Agent, or Firm—Finnegan, Henderson, Farabow, Garrett & Dunner

[57] ABSTRACT

A steering wheel lock device comprising a key rotor housed in a rotor case and adapted to be turned between a lock position and an operative position by a key inserted into said key rotor, said key rotor being allowed to move in its axial direction by pressing operation of the key; a cam rotated in association with the key rotor so as to move the lock member; a regulating member having a distal end portion; a regulating projection formed on the outer peripheral surface of the key rotor in such a manner that when the key rotor is turned from the lock position to the operative position, the distal end portion of the regulating member passes past the regulating projection relative thereto, thereby allowing rotation of the key rotor toward the operative position, and when the key rotor is turned from the operative position to the lock position with the key rotor kept in a non-pressed condition, the regulating projection is engaged with the distal end portion of the regulating member, thereby preventing the key rotor from turning to the lock position; and a bypass passage provided in the outer peripheral surface of said key rotor so as to bypass said regulating projection.

7 Claims, 3 Drawing Sheets

POSITION "LOCK"

"LOCK" → "ACC"

POSITION "ACC"

POSISION "ON"

PRESSING OPERATION IN THE POSITION "ACC"

STEERING WHEEL LOCK DEVICE

This application is a continuation of application Ser. No. 07/800,031 filed Nov. 29, 1991, now abandoned.

BACKGROUND OF THE INVENTION

This invention relates to a steering wheel lock device of a so-called two-stage operation type in which when a key rotor in an operative position is pressed by a key, the key rotor can be turned into a lock position.

In a steering wheel lock device of this type, a projection is formed on an inner periphery of a rotor case, and a regulating projection is formed on an outer periphery of a key rotor housed in the rotor case. Provided near the regulating projection is a groove relative to which this projection can slidingly move. When the key rotor is to be turned from an operative position (i.e., the position ACC or the position ON) to a lock position (i.e., the position LOCK), the regulating projection of the key rotor abuts against the projection of the rotor case to thereby prevent the key rotor from angular movement to the position LOCK if the rotor key is not pressed or pushed in and turned. On the other hand, if the key rotor is pressed in and turned, the key rotor can then be turned to the position LOCK. This construction is disclosed, for example, in Japanese Laid-Open Utility Model Application No. 63-74359.

In the above construction, when the key rotor angularly moves between the position LOCK and the position ACC, the projection on the rotor case always passes along the same path relative to the key rotor. Therefore, when the key rotor is to be turned from the position LOCK toward the position ACC, the key rotor is automatically moved in the inward direction even though the key is not pressed in, causing the operator to feel awkward or uneasy when turning the key. This causes a feeling of uneasiness.

SUMMARY OF THE INVENTION

Therefore, it is an object of this invention to provide a steering wheel lock device in which a key rotor can be turned without a feeling of awkwardness or uneasiness, and the operability is improved.

According to the present invention, there is provided a steering wheel lock device comprising: a rotor case; a key rotor housed in the rotor case and adapted to be turned between a lock position and an operative position by a key inserted into the key rotor, the key rotor being allowed to move in its axial direction by pressing operation of the key; a lock member for locking and unlocking a steering wheel; a cam rotated in association with the key rotor so as to move the lock member; a regulating member having a distal end portion in contact with an outer peripheral surface of the key rotor, the distal end portion sliding relative to the outer peripheral surface of the key rotor in association with the rotation of the key rotor; a regulating projection formed on the outer peripheral surface of the key rotor in such a manner that, when the key rotor is turned from the lock position to the operative position with the key rotor kept in a non-pressed condition, the distal end portion of the regulating member passes over the regulating projection relative thereto, thereby allowing rotation of the key rotor toward the operative position, and when the key rotor is turned from the operative position to the lock position with the key rotor kept in a non-pressed condition, the regulating projection is engaged with the distal end portion of the regulating member, thereby preventing the key rotor from turning to the lock position; and a bypass passage provided in the outer peripheral surface of said key rotor so as to bypass said regulating projection in such a manner that, when said key rotor is pressed in the operative position, said distal end portion of said regulating member is introduced into said bypass passage relative thereto, so that the engagement of said distal end portion with said regulating projection is released, thereby allowing said key rotor to be turned toward the lock position.

When the key rotor held in the lock position is to be turned to the operative position, the distal end portion of the regulating member slides along a path in which this distal end portion passes past the regulating projection. During this time, the key rotor is not moved in the direction of pressing. On the other hand, when the key rotor held in the operative position is to be turned to the lock position, the key rotor is pressed, so that the distal end portion of the regulating member slides along the bypass passage bypassing the regulating projection. Therefore, the path of sliding movement of the distal end portion of the regulating member for angularly moving the key rotor from the lock position to the operative position is different from the path for angularly moving the key rotor from the operative position to the lock position. Particularly when the key rotor is to be turned from the lock position to the operative position, the key rotor does not move in the axial direction, and therefore there does not occur a feeling of awkwardness or uneasiness in contrast with the construction in which the key rotor is automatically moved in the inward direction.

BRIEF DESCRIPTION OF THE DRAWINGS

FIG. 1 is a steering wheel lock device according to a first embodiment of the invention exploded perspective view of an;

FIG. 2 is a cross-sectional view of the steering wheel lock device of FIG. 1;

FIG. 3 is a front elevational view of the steering wheel lock device of FIG. 1;

FIG. 4 is a cross-sectional view of the steering wheel lock device taken along the line IV—IV of FIG. 1;

FIGS. 5 to 9 are views explanatory of the operation of the steering wheel lock device of FIG. 1, showing different conditions of the operation.

DETAILED DESCRIPTION OF THE PREFERRED EMBODIMENTS

One preferred embodiment of the present invention will now be described with reference to FIGS. 1 to 9.

Figure 2:
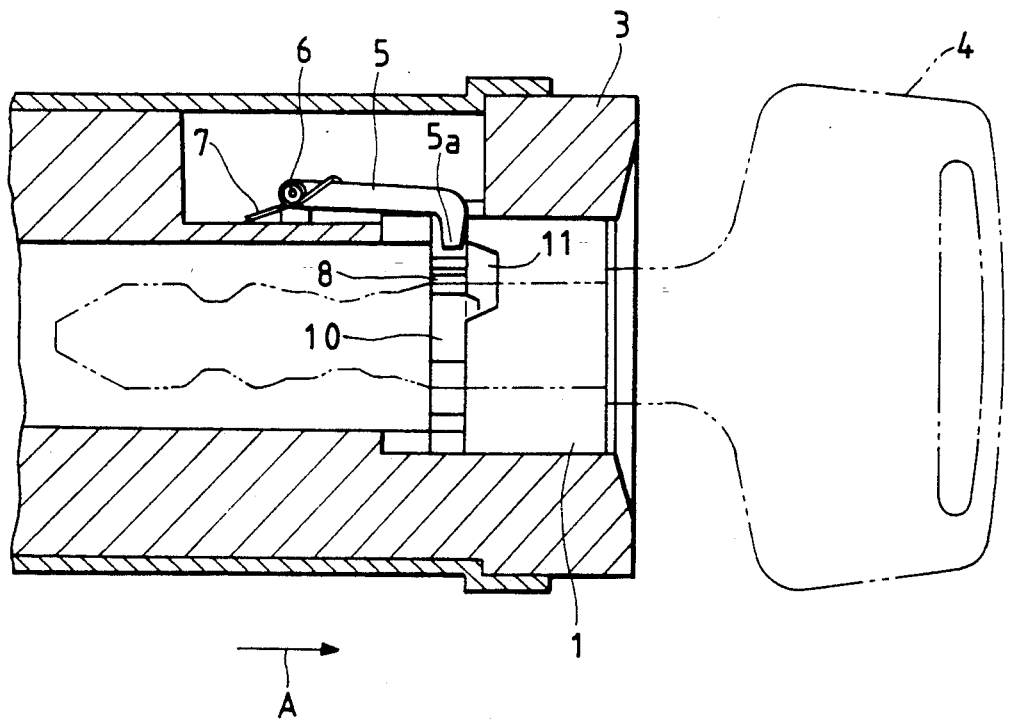
Figure 3:
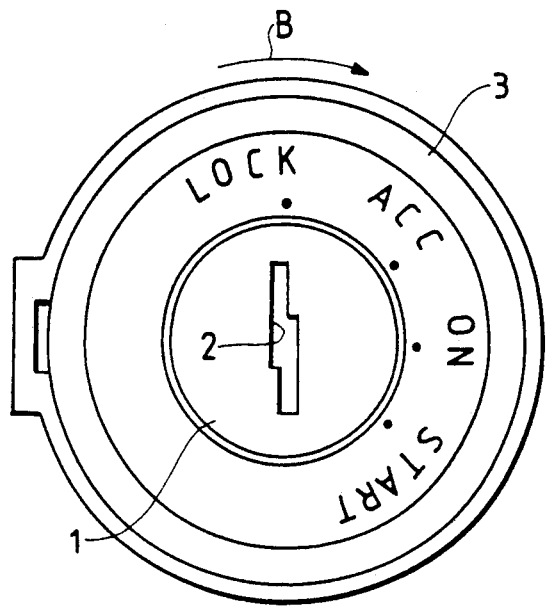

Referring to FIGS. 2 and 3, a key rotor 1 has a key insertion hole 2, and is housed in a rotor case 3 for angular movement in a circumferential direction and also for axial movement. The key rotor 1 is normally urged in an axially outward direction (i.e., direction of arrow A) by a compression spring (not shown). When the key rotor 1 is in a lock position (i.e., position LOCK), a key 4 can be inserted into and withdrawn from the key insertion hole 2. The key rotor 1 can be turned by the key 4 sequentially from the position LOCK toward operative positions ACC, ON and START. In the operative positions, the key 4 can not be inserted and withdrawn. As is well known, although not shown in the drawings, at the inner side of the key rotor 1, there is provided a cam angularly movable in unison with the key rotor 1 so as to move a lock member for locking and unlocking a steering wheel, and also there is provided an ignition switch which is operated upon angular movement of the key rotor 1.

A regulating member 5 of a generally L-shape is pivotally mounted at one end on the rotor case 3 by a pin 6, and is urged by a coil spring 7 in such a manner that its distal end portion 5a is brought into contact with the outer peripheral surface of the key rotor 1. When the key rotor 1 is turned, the distal end portion 5a slidingly moves relative to the outer peripheral surface of the key rotor 1.

Figure 1:
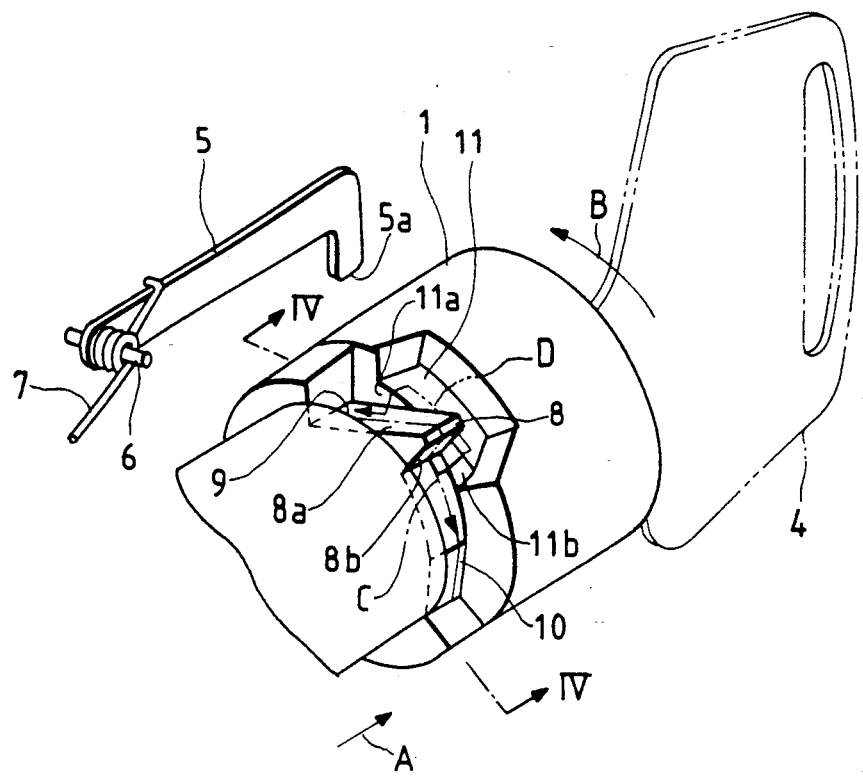
FIGS. 1 to 9 show one preferred embodiment of the present invention.
Figure 4:
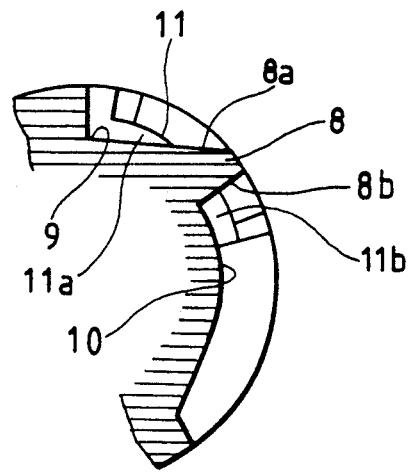
Figure 5:
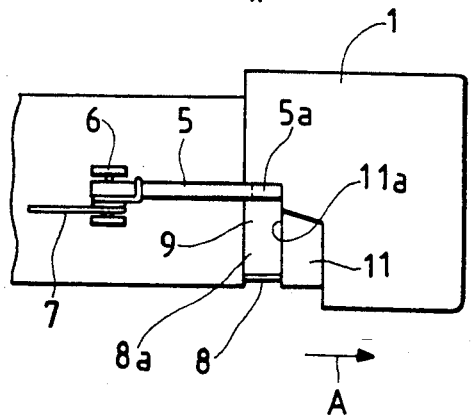

A regulating projection 8 is formed on that portion of the outer peripheral surface of the key rotor 1 where the distal end portion 5a of the regulating member 5 slidingly moves. As shown in FIGS. 1 and 4, the regulating projection 8 has a slanting surface 8a at one side in the circumferential direction, and also has a perpendicular surface 8b at the other side. A first recess 9 is provided adjacent to the slanting surface 8a of the regulating projection 8, and is continuous with the slanting surface 8a. A second recess 10 is provided adjacent to the perpendicular surface 8b. A bypass passage 11 is formed in the outer peripheral surface of the key rotor 1 in bypassing relation to the regulating projection 8. The bypass passage 11 is greater in height than the first and second recesses 9 and 10, and is continuous with the first recess 9 via a perpendicular surface 11a, and is continuous with the second recess 10 via a slanting surface 11b. When the key rotor is in the position LOCK and is not pressed in, the distal end portion 5a of the regulating member 5 is received in the first recess 9, as shown in FIG. 5.

The operation of the above construction will now be described.

Figure 6:
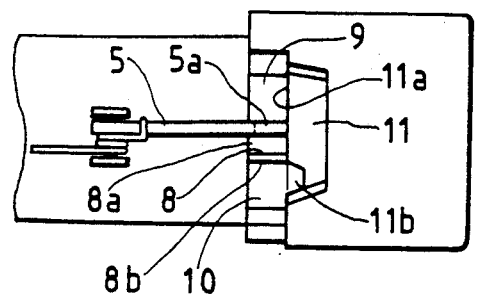

The key 4 is inserted into the key hole 2 of the key rotor 1 held in the position LOCK, and then the key rotor 1 is turned by the key 4 in a direction of arrow B without pressing the key rotor 1, so that the distal end portion 5a of the regulating member 5 moves from the first recess 9 and slides along the slanting surface 8a of the regulating projection 8 (see FIG. 6). When the key rotor 1 is turned to the position ACC, the distal end portion 5a of the regulating member 5 passes over the regulating projection 8 and drops into the second recess 10. When the key rotor 1 is turned to the position START via the position ON, the engine is started, and upon release of the hand from the key 4, the key rotor 1 is automatically returned to the position ON, and the distal end portion 5a of the regulating member 5 remains stopped at the central portion of the second recess 10 (see FIG. 8). At this time, when the key rotor 1 is turned to the operative positions (the position ACC to the position START), the lock member is moved by the cam (not shown) moved in unison with the key rotor 1, and the locking of the steering wheel is released by this lock member.

Figure 7:
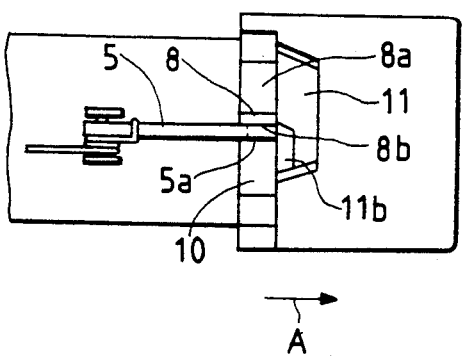
Figure 8:
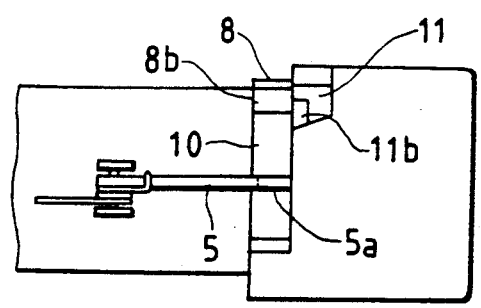
Figure 9:
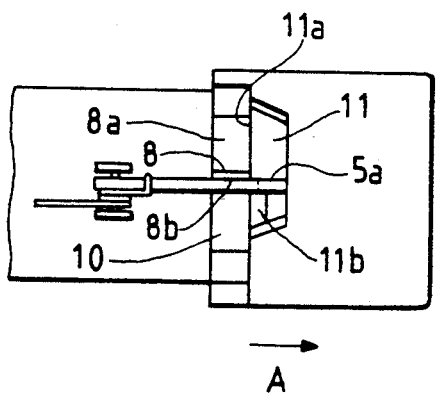

When the key rotor 1 is turned from the position ON (FIG. 8) toward the position LOCK (that is, in a direction opposite to the direction of arrow B) without pressing the key rotor 1, the perpendicular surface 8b of the regulating projection 8 is engaged with the distal end portion 5a of the regulating member 5 upon angular movement of the key rotor 1 as far as the position ACC (see FIG. 7). Therefore, in this condition, the key rotor 1 can not be turned to the position LOCK. Therefore, when the key rotor 1 is turned as far as the position ACC, the key rotor 1 and the key 4 are presently causing the key rotor 1 to be moved in a direction opposite to the direction of arrow A, so that the distal end portion 5a of the regulating member 5 intrudes from the second recess 10 into the bypass passage 11 via the slanting surface 11b (see FIG. 9). Then, in this condition, the key rotor 1 is turned in the direction opposite to the direction of arrow B, so that the distal end portion 5a of the regulating member 5 moves into the first recess 9 through the bypass passage 11 and the perpendicular surface 11a. Thus, the key rotor 1 can be turned as far as the position LOCK. When the key rotor 1 is turned to the position LOCK, the key 4 can be withdrawn from the key insertion hole 2, and upon withdrawal of the key 4, the steering wheel is held in a locked condition.

In the above-described embodiment, when the key rotor 1 is to be turned from the position LOCK to the operative position, the distal end portion 5a of the regulating member 5 slides along a path indicated by a dot-and-dash arrow C in FIG. 1 so as to pass over the regulating projection 8. When the key rotor 1 is to be turned from the position ACC to the position LOCK, the distal end portion 5a of the regulating member 5 slides along a path indicated by a dots-and-dash arrow D in FIG. 1 which path passes through the bypass passage 11, so as to bypass the regulating projection 8. Therefore, the path of sliding movement of the distal end portion 5a of the regulating member 5 for angularly moving the key rotor 1 from the position LOCK to the operative position is different from the path for angularly moving the key rotor 1 from the operative position to the position LOCK. Particularly, when the key rotor 1 is to be turned from the position LOCK to the operative position, the key rotor is not moved in the axial direction, and therefore there does not occur a feeling of uneasiness in contrast with the construction in which the key rotor 1 is automatically moved in the direction of pressing. Therefore, the operability is improved.

Particularly in the above embodiment, the perpendicular surface 11a is provided between the first recess 9 and the bypass passage 11, and therefore even when the operator intends to press the key rotor 1 held in the position LOCK, the perpendicular surface 11a abuts against the distal end portion 5a of the regulating member 5, so that the key rotor 1 held in the position LOCK can not be pressed.

Figure 10:
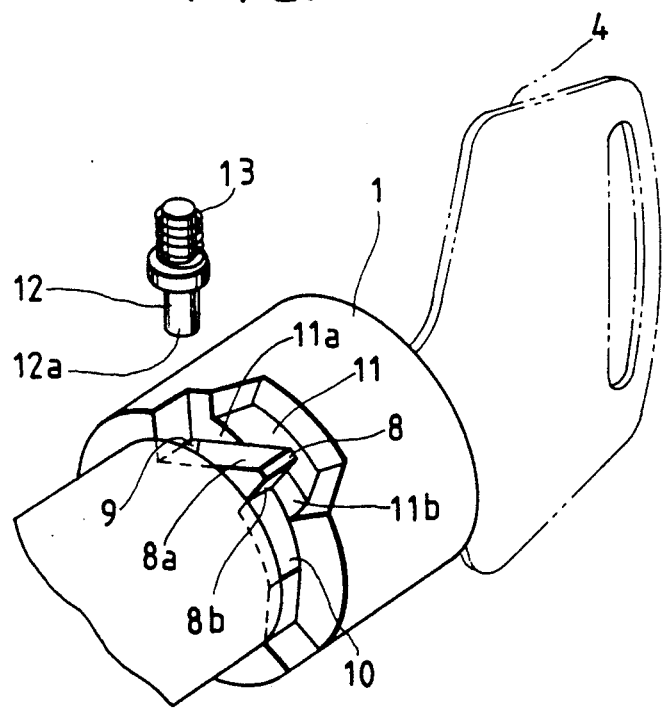
FIG. 10 is a view similar to FIG. 1, but showing a second embodiment of the present invention.

FIG. 10 shows a modified form of the present invention. In this case, a regulating member 12 has a rod-like shape, and is mounted on the rotor case 3 for movement radially of the key rotor 1, and is urged by a compression coil spring 13 in such a manner that its distal end portion 12a is abutted against the outer peripheral surface of the key rotor 1. This construction also achieves similar effects as attained with the above embodiment.

As is clear from the above description, according to the present invention, the path of sliding movement of the distal end portion of the regulating member for angularly moving the key rotor from the lock position to the operative position is different from the path for angularly moving the key rotor from the operative position to the lock position. Particularly when the key rotor is to be turned from the lock position to the operative position, the key rotor does not move in the axial direction, and therefore there does not occur a feeling of uneasiness in contrast with the construction in which the key rotor is automatically moved in the direction of pressing. Therefore, the operability is improved.

What is claimed is:

1. A steering wheel lock device comprising:
   a rotor case;
   a key rotor slidably mounted in said rotor case for angular movement in a circumferential direction and also for axial movement, and adapted to be turned between a lock position and an operative position by a key inserted into said key rotor, said key rotor being movable in its axial direction by pressing of the key;
   a regulating member having a distal end portion in contact with an outer peripheral surface of said key rotor, said distal end portion sliding relative to the outer peripheral surface of said key rotor in association with the rotation of said key rotor;
   a regulating projection formed on the outer peripheral surface of said key rotor and projecting radially outward from the outer peripheral surface of said key rotor in such a manner that when said key rotor is turned from the lock position to the operative position with said key rotor kept in a non-pressed condition, said distal end portion of said regulating member slides along the upper surface of said regulating projection, thereby allowing rotation of said key rotor toward the operative position without axial movement of said key rotor, and when said key rotor is turned from the operative position to the lock position with said key rotor kept in a non-pressed condition, said regulating projection is engaged with the distal end portion of said regulating member, thereby preventing said key rotor from turning to the lock position; and
   a bypass passage provided in the outer peripheral surface of said key rotor so as to bypass said regulating projection in such a manner that, when said key rotor is pressed in the operative position, said distal end portion of said regulating member is introduced into said bypass passage, so that the engagement of said distal end portion with said regulating projection is released, thereby allowing said key rotor to be turned toward the lock position.

2. A steering wheel lock device according to claim 1, wherein said regulating member comprises a L-shaped lever mounted on said rotor case.

3. A steering wheel lock device according to claim 1, wherein said regulating member comprises a rod mounted on said rotor case and adapted for movement along a radius of said key rotor.

4. A steering wheel lock device according to claim 1, wherein said regulating projection has:
   a first slanting surface at one side in the circumferential direction; and
   a first perpendicular surface at the other side in the circumferential direction.

5. A steering wheel lock device according to claim 4, further comprising:
   a first recessed portion provided adjacent to and continuous with said first slanting surface; and
   a second recessed portion provided adjacent to and continuous with said fist perpendicular surface.

6. A steering wheel lock device according to claim 4, wherein said bypass passage is greater in height than said first and second recessed portions, one end portion of said bypass passage is continuous with said first recessed portion via a second perpendicular surface, and the other end portion of said bypass passage is continuous with said second recessed portion via a second slanting surface.

7. A steering wheel lock device according to claim 1, wherein said regulating projection has a top portion, and said bypass passage is lower in height than said top portion of said regulating projection.

* * * * *

UNITED STATES PATENT AND TRADEMARK OFFICE
CERTIFICATE OF CORRECTION

PATENT NO. : 5,289,707
DATED : March 01, 1994
INVENTOR(S) : Noriyuki Suzuki

It is certified that error appears in the above-indentified patent and that said Letters Patent is hereby corrected as shown below:

Claim 5, Column 6, Line 26 change "fist" to --first--.

Signed and Sealed this

Seventeenth Day of January, 1995

Attest:

BRUCE LEHMAN

*Attesting Officer*   *Commissioner of Patents and Trademarks*